(12) United States Patent
Hubert et al.

(10) Patent No.: US 6,700,569 B1
(45) Date of Patent: Mar. 2, 2004

(54) REDUCING THE PROCESSOR OPERATING TIME FOR A PROGRAMMABLE CONTROLLER

(75) Inventors: Rolf Hubert, Bonn (DE); Juergen Hoegener, Niederkassel (DE); Dieter Bauerfeind, Bonn (DE)

(73) Assignee: Moeller GmbH, Bonn (DE)

( * ) Notice: Subject to any disclaimer, the term of this patent is extended or adjusted under 35 U.S.C. 154(b) by 0 days.

(21) Appl. No.: 09/673,540

(22) PCT Filed: Dec. 23, 1998

(86) PCT No.: PCT/DE98/03778

§ 371 (c)(1),
(2), (4) Date: Nov. 30, 2000

(87) PCT Pub. No.: WO99/54793

PCT Pub. Date: Oct. 28, 1999

(30) Foreign Application Priority Data

Apr. 17, 1998 (DE) .......................... 198 17 913

(51) Int. Cl.$^7$ ................................................ G09G 5/00
(52) U.S. Cl. ..................... 345/212; 700/88; 700/17; 700/27; 345/205; 345/206; 345/211
(58) Field of Search .......................... 700/83, 27, 17; 345/204–206, 736, 210–212, 214, 215, 51, 52; 713/323, 321

(56) References Cited

U.S. PATENT DOCUMENTS

| | | | | |
|---|---|---|---|---|
| 5,396,443 A | * | 3/1995 | Mese et al. ................. 713/321 |
| 5,463,408 A | * | 10/1995 | Mio ............................ 345/52 |
| 5,465,215 A | * | 11/1995 | Strickland et al. .......... 700/180 |
| 5,822,599 A | * | 10/1998 | Kidder et al. ............... 713/324 |
| 5,944,828 A | * | 8/1999 | Matsuoka .................... 713/323 |
| 5,978,923 A | * | 11/1999 | Kou ............................ 713/323 |
| 6,144,363 A | * | 11/2000 | Alloul et al. ................ 345/618 |
| 6,393,499 B1 | * | 5/2002 | Chaiken et al. ............. 710/19 |

FOREIGN PATENT DOCUMENTS

GB      2205177 A   *  11/1988   ............. F24C/7/08

OTHER PUBLICATIONS

Messen, Prufen, Automatisieren 7/8–97, pp. 6, 8, 10, 15—Abstract enclosed.

P. Wratil: "Speicherprogrammierbare Steuerung in der Automatisierungstechnik", Vogel Buchverlag Wurzburgm, 1989, pp. 157–160—Abstract enclosed.

\* cited by examiner

*Primary Examiner*—Anil Khatri
*Assistant Examiner*—Crystal J. Barnes
(74) *Attorney, Agent, or Firm*—Kenyon & Kenyon

(57) ABSTRACT

A programmable controller having a processing unit, a screen, a control panel, and signal inputs and outputs, all of which are accommodated in a common housing. Switching functions can be programmed by the user via a menu-driven user interface on the screen. The status display is capable of being switched between an active and an inactive display status of the screen.

6 Claims, 1 Drawing Sheet

REDUCING THE PROCESSOR OPERATING TIME FOR A PROGRAMMABLE CONTROLLER

FIELD OF THE INVENTION

The present invention relates to a programmable controller having a processing unit, a display screen, an operator unit and signal inputs and signal outputs, where the processing unit, the display screen, the operator unit, the signal inputs and signal outputs are accommodated in a common housing, and where switching functions can be programmed by the user on the basis of predetermined functions by using a menu-assisted user interface on the display screen.

RELATED TECHNOLOGY

Such controllers have been programmed in a STOP state (application program not active) of the controller using a control panel integrated into the controller, with graphical monitoring of a screen likewise integrated into the controller. Further, the application program can be examined via the screen of the controller in the STOP state, and signal states of inputs and outputs of the controller are graphically presented in the RUN state (application program active).

SUMMARY OF THE INVENTION

An object of the present invention is to devise such a programmable controller, which markedly increases the capacity of the controller while maintaining the same level of operator convenience or programming convenience.

The present invention provides a programmable controller having a processing unit, a screen (14), a control panel (8), and having signal inputs (4) and signal outputs (6), the processing unit, the screen (14), the control panel (8), the signal inputs (4) and signal outputs (6) being accommodated in a common housing (2), and switching functions being programmable by the user via a menu-driven user interface on the screen (14). The status display is capable of being switched between an active display status, in which signal states of inputs and outputs of the controller, as well as signal states of function blocks and the like are displayed on the screen, and an inactive display status, in which no instantaneous display of signal states is presented on the screen.

According to the present invention, the processor running time or the cycle time of an executing (active) application program can be influenced in that the status display of the screen is capable of being switched between an active display status, in which signal states of inputs and outputs of the controller, and signal states of function blocks and the like, are displayed on the screen, and an inactive display status, in which no current display of signal states is presented on the screen. In standard mode, the status display on the screen is active. For this purpose, the signal states to be displayed must be interrogated at regular intervals during the execution of the application program and resupplied to the display (refresh). This refresh, however, requires valuable cycle time. In accordance with the present invention, the controller design makes it possible to turn off the screen's status display, so that there is no refresh at regular intervals, and the cycle time is correspondingly reduced. In this way, processes that are even more time-critical can advantageously be managed.

In a specific embodiment of the present invention, a combination of at least two keys causes the status of the display status to be switched. Thus the status display is switched by preferably mutual actuation of two defined keys. In another specific embodiment of the present invention, this switching is implemented automatically, for example by the status display being activated only in every n-th cycle. If the average cycle time is 5–10 ms and a characteristic time relating to the perceptual capacity of the human eye is approximately 200 ms, it is desirable to activate the status display only in every twentieth to fortieth cycle, and thus to achieve a reduction of the cycle time.

DESCRIPTION OF THE DRAWINGS

Further advantages of the present invention are discussed in further detail below with reference to the drawings, in which.

DETAILED DESCRIPTION

Figure 1:
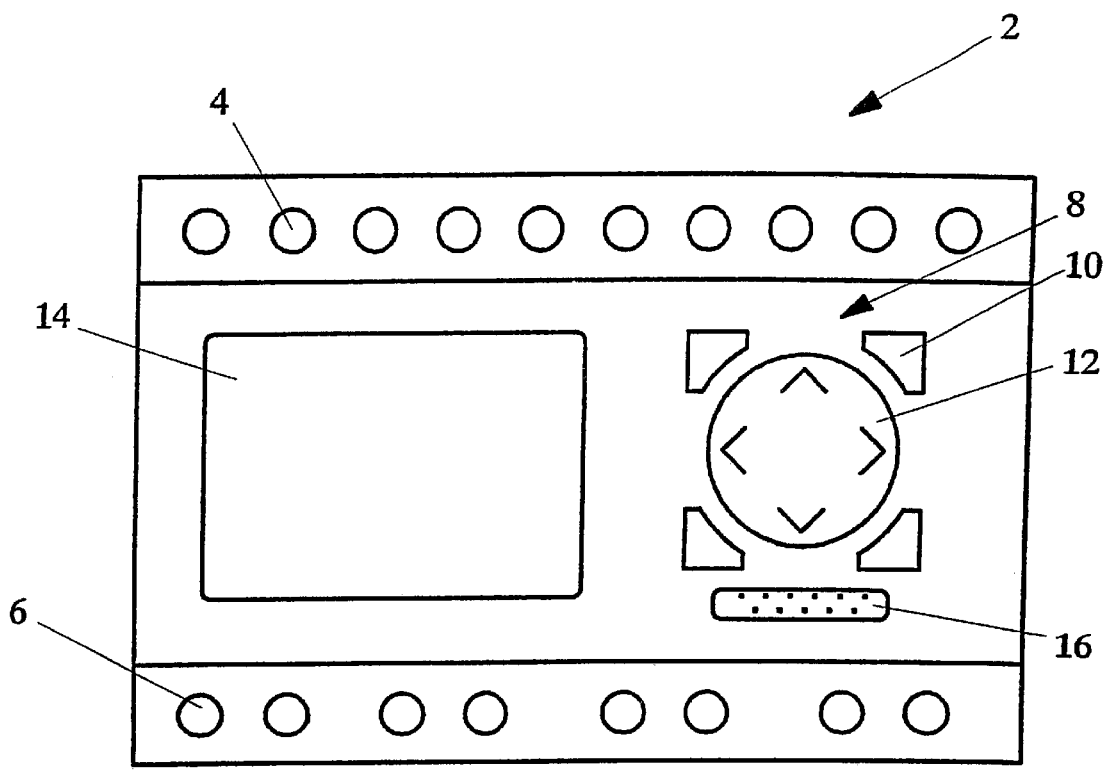
FIG. 1 shows a schematic diagram of a programmable logic controller.

FIG. 1 shows a programmable logic controller having a housing 2, and having an array of signal inputs 4 and signal outputs 6. Monitored by a program (application program), the programmable logic controller switches the current flowing between the signal inputs 4 and the signal outputs 6. The program can be input to the processing unit or processing/memory unit (e.g., microcontroller) of the controller via a control panel 8, which preferably includes four control keys 10 and a multifunction key 12. Input and program execution can be observed on a screen 14. A menu-driven user interface is possible on screen 14 during programming, while the status display of signal inputs and signal outputs 4, 6 of the controller and/or the status display of signal inputs and signal outputs of function blocks and/or parameters of function blocks is possible during operation. According to the present invention, the status display of screen 14 can be switched between an active and an inactive status using predefined means 8, 10, 12. In one preferred embodiment, switching is effected by the combination of two control keys 10. It is also conceivable, however, to effect switching by a single key. Alternatively, the controller can also be programmed and the parameters assigned from an external computer via interface 16.

Figure 2:
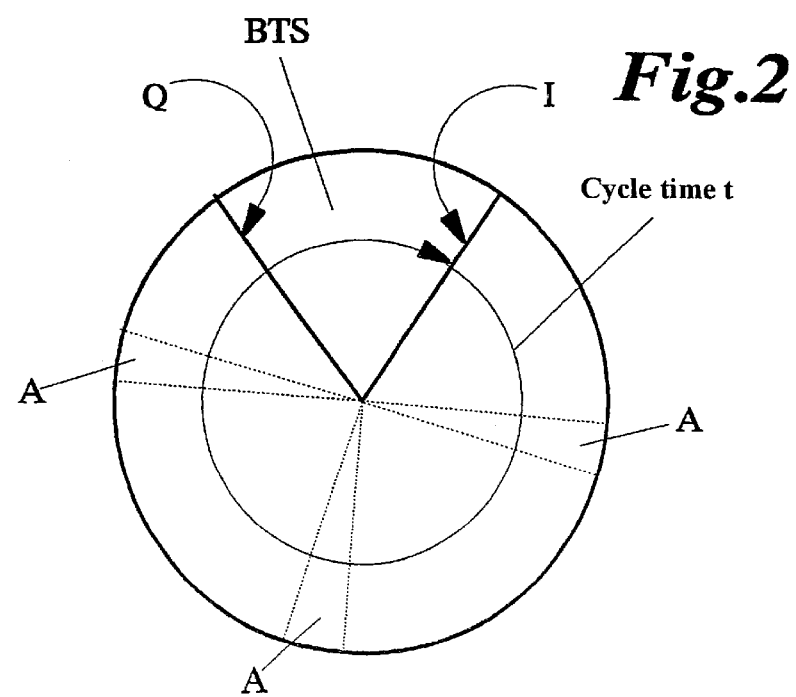
FIG. 2 shows an application program in terms of cycle time in the form of a cycle timing diagram.

FIG. 2 shows schematically an application program in terms of its cycle time (time for the one-time execution of the application program). The cycle time is represented in the form of a cycle timing diagram. The essential time segments of a cycle time are formed by "reading in of signal inputs" (I), "execution of application program," "reading out to signal outputs" (Q), an "operating system sector" (BTS), and at least one "display sector" (A). If, through the design according to the present invention, the status display of screen 14 is switched into the inactive status, the portion of cycle time for the display sector (A) drops out, so that the cycle time is reduced by the time of the display sector (A). In one further refinement of the present invention, this status can be stored so that the previously set display status remains set, even after a power outage with subsequent restarting of the controller. In the inactive display status, the screen display is not updated (refreshed), and advantageously is simply turned off (no display).

What is claimed is:

1. A programmable controller comprising:
   a processing unit;
   a screen including a menu-driven user interface;

a control panel;

at least one signal input;

at least one signal output; and a housing, the processing unit, the screen, the control panel, the at least one signal input and the at least one signal output being disposed in the housing;

wherein a switching function of the controller is arranged to switch the current flowing between the at least one signal input and the at least one signal output and is programmable using the menu-driven user interface, and wherein a status display of the screen is capable of being switched between an active display status in which signal states of at least one of the signal input, the signal output and a function block of the programmable controller are displayed on the screen, and an inactive display status in which no current display of signal states is presented on the screen.

2. The programmable controller as recited in claim 1 wherein the control panel includes a key useable for the switching of the status display.

3. The programmable controller as recited in claim 1 wherein the control panel includes a plurality of keys, a combination of two or more of the keys being useable for the switching of the status display.

4. The programmable controller as recited in claim 1 wherein a software is useable for the switching of the status display.

5. A programmable controller, comprising:

a processing unit;

a display screen;

at least one signal input;

at least one signal output;

a common housing, the processing unit, the display screen, the at least one signal input and the at least one signal output accommodated in the common housing; and an arrangement configured to program switching functions to switch the current flowing between the at least one signal input and the at least one signal output on the basis of predetermined function in accordance with a menu-assisted user interface on the display screen;

wherein a status display of the screen is switchable between an active display status in which signal states of at least one of the at least one signal input, the at least one signal output and a function block of the programmable controller are displayed on the screen, and an inactive display status in which no current display of signal states is presented on the screen.

6. A programmable controller, comprising:

processing means;

display means;

at least one signal input;

at least one signal output;

a common housing, the processing means, the display means, the signal input and the signal output accommodated in the common housing; and means for programming switching functions to switch the current flowing between the at least one signal input and the at least one signal output on the basis of predetermined functions in accordance with a menu-assisted user interface on the display means;

wherein a status display of the screen is switchable between an active display status in which signal states of at least one of the at least one signal input, the at least one signal output and a function block of the programmable controller are displayed on the screen, and an inactive display status in which no current display of signal states is presented on the screen.

* * * * *